(No Model.)

J. R. CONNELL.
BICYCLE.

No. 604,710. Patented May 24, 1898.

Witnesses:
Geo. N. Srang,
N. E. Oliphant.

Inventor:
James R. Connell
By H. G. Underwood
Attorneys

UNITED STATES PATENT OFFICE.

JAMES R. CONNELL, OF MILWAUKEE, WISCONSIN, ASSIGNOR, BY MESNE ASSIGNMENTS, TO THE LEAGUE CYCLE MANUFACTURING COMPANY, OF SAME PLACE.

BICYCLE.

SPECIFICATION forming part of Letters Patent No. 604,710, dated May 24, 1898.

Application filed September 14, 1896. Serial No. 605,775. (No model.)

*To all whom it may concern:*

Be it known that I, JAMES R. CONNELL, a citizen of the United States, and a resident of Milwaukee, in the county of Milwaukee and State of Wisconsin, have invented certain new and useful Improvements in Bicycles; and I do hereby declare that the following is a full, clear, and exact description thereof.

My invention contemplates a bicycle drive-shaft that is preferably in one piece with the pedal-cranks, a screw-threaded sleeve having screw-thread engagement with the hub of a sprocket-wheel spider fast on the shaft, and ball-bearing cones in screw-thread connection with the sleeve, this construction and arrangement of parts being hereinafter more specifically set forth with reference to the accompanying drawings and subsequently claimed.

Figure 2:
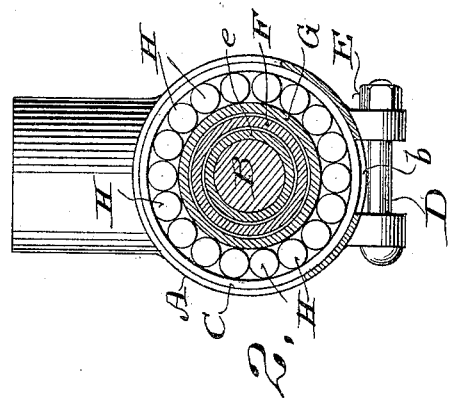
Figure 1:
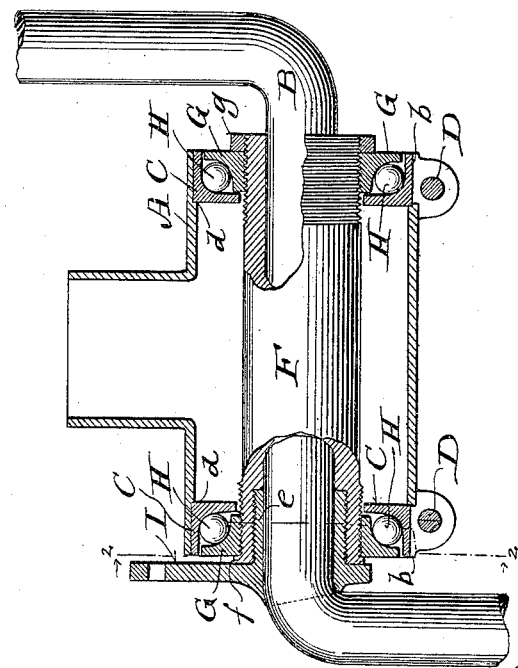

Figure 1 of the drawings represents a sectional view of a tubular hanger and ball-bearings in connection with a one-piece drive-shaft and pedal-cranks, together with a sleeve that is held to rotate with the shaft and has screw-threaded ends engaged by the cone-sections of said bearings, the sleeve being partly broken away; Fig. 2, a transverse section indicated by line 2 2 in the preceding figure; and Fig. 3, a detail elevation, partly in section, illustrating said shaft and cone-sections of the ball-bearings in connection with a two-part sleeve.

Referring by letter to the drawings, A represents a tubular hanger for the driving-shaft B of a bicycle or analogous vehicle, and, as herein shown, the hanger may be provided with longitudinal recesses $b$, having width equal to the diameter of the shaft and depth equal to that of ball-cups C, set in the ends of said hanger. The hanger is also shown as having depending ears $c$, flanking the recesses $b$, and these ears are provided with apertures for bolts D, each of which has a clamp-nut E run thereon. As thus far described the hanger is similar in many respects to some others known to the art, although provision is made for closing the end recesses $b$ by the ball-cups C in order to exclude dust, these recesses being employed as means to obtain clearance that facilitates the placing or removal of said shaft and parts thereon.

The ends of the hanger are preferably counterbored to form shoulders $d$, against which the ball-cups C are seated, and by tightening the nuts E on bolts D said hanger ends are contracted to bind said ball-cups tight in their places, this construction and arrangement of parts serving to cheapen construction by doing away with the usual screw-thread or braze connection of the aforesaid cups and hangers.

As herein shown, the shaft B is preferably one of those having pedal-cranks in one piece therewith, and the whole may be drop-forged or made from a tool-steel rod bent into shape. The hub $e$ of a sprocket-wheel spider I is rigidly secured to the shaft by brazing or other suitable means. In screw-thread engagement with the sprocket-wheel hub is one end of a sleeve F, that may be split or otherwise, the ends of this sleeve being exteriorly screw-threaded for the engagement of tapped bearing-cones G for balls H in the cups C, above specified. That end of the sleeve that comes next the sprocket-wheel spider is shown provided with an annular flange $f$, that serves as a stop for the adjacent bearing-cone G, the latter being generally termed the "stationary cone," and a check-nut $g$ is shown run on the other end of said sleeve against what is usually termed the "adjusting-cone."

Figure 3:
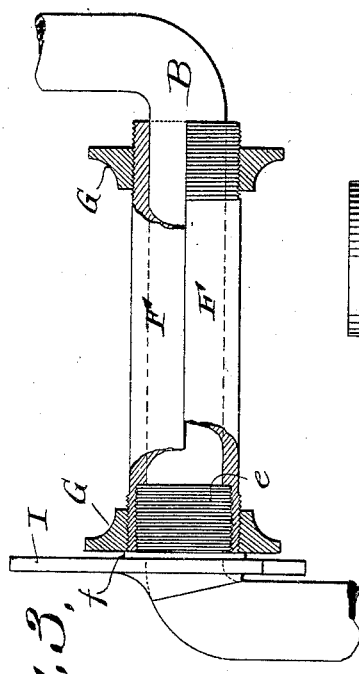

When the shaft and its pedal-cranks are formed in one piece by bending a suitable rod, a non-sectional sleeve F, such as is shown in Fig. 1, may be positioned prior to the completion of the device; but a substitute sleeve, or one employed in connection with a one-piece drop-forged shaft and pedal-cranks, is necessarily made in sections, as shown in Fig. 3, these sections being held together by the bearing-cones G, above specified.

By the above-described construction and arrangement of parts provision is made for fine adjustment of the bearing-cones with respect to stationary ball-cups, and detrimental tool-work on the shaft is avoided. It also follows that if the thread on the sleeve becomes worn or jammed another sleeve may be readily substituted at but little expense, the shaft being unimpaired.

Having thus described my invention, what I claim as new, and desire to secure by Letters Patent, is—

A bicycle drive-shaft, a sprocket-wheel spider having its hub fast on the shaft, a shaft-sleeve having an annularly-flanged end in screw-thread connection with said hub, a ball-bearing cone in similar connection with the sleeve against its flange, and another such cone in like connection with the other end of said sleeve.

In testimony that I claim the foregoing I have hereunto set my hand, at Milwaukee, in the county of Milwaukee and State of Wisconsin, in the presence of two witnesses.

JAMES R. CONNELL.

Witnesses:
H. E. OLIPHANT,
B. C. ROLOFF.